United States Patent
Kayama et al.

(10) Patent No.: US 7,591,991 B2
(45) Date of Patent: Sep. 22, 2009

(54) ULTRAFINE PARTICULATE TITANIUM OXIDE WITH LOW CHLORINE AND LOW RUTILE CONTENT, AND PRODUCTION PROCESS THEREOF

(75) Inventors: Susumu Kayama, Toyama (JP); Jun Tanaka, Toyama (JP)

(73) Assignee: Showa Denko K.K., Tokyo (JP)

( * ) Notice: Subject to any disclaimer, the term of this patent is extended or adjusted under 35 U.S.C. 154(b) by 99 days.

(21) Appl. No.: 10/506,547

(22) PCT Filed: Mar. 6, 2003

(86) PCT No.: PCT/JP03/02673

§ 371 (c)(1),
(2), (4) Date: Sep. 3, 2004

(87) PCT Pub. No.: WO03/074426

PCT Pub. Date: Sep. 12, 2003

(65) Prior Publication Data

US 2005/0076811 A1    Apr. 14, 2005

Related U.S. Application Data

(60) Provisional application No. 60/363,305, filed on Mar. 11, 2002.

(30) Foreign Application Priority Data

Mar. 6, 2002 (JP) ................................ 2002-060541

(51) Int. Cl.
*C01G 23/04* (2006.01)
*C01G 23/047* (2006.01)
*C01G 23/07* (2006.01)

(52) U.S. Cl. .................... 423/610; 423/611; 423/612; 423/613

(58) Field of Classification Search .............. 361/321.1, 361/321.5; 524/858; 136/252; 502/350; 423/610, 611, 612, 613
See application file for complete search history.

(56) References Cited

U.S. PATENT DOCUMENTS 2,240,343 A * 4/1941 Muskat .................. 423/613

(Continued)

FOREIGN PATENT DOCUMENTS

CA        2 383 334 C    11/2005

(Continued)

OTHER PUBLICATIONS

A. Fujishima, et al. "Hikari Kuriin Kakumei", CMC Publishing Co., Ltd. pp. 143-145, 1997.

(Continued)

*Primary Examiner*—Timothy C Vanoy
(74) *Attorney, Agent, or Firm*—Sughrue Mion, PLLC

(57) ABSTRACT

An anatase-type ultrafine particulate titanium oxide produced through a vapor-phase process, which has low chlorine content and exhibits excellent dispersibility as compared with conventional titanium oxide having a BET specific surface area comparable to that of the ultrafine particulate titanium oxide. When the ultrafine particulate titanium oxide is subjected to dechlorination, the titanium oxide satisfies the relation between BET surface area (B) and chlorine content (C) represented by the formula $C \leq 650e^{0.02B}$. The ultrafine particulate titanium oxide has a D90 of 2.5 (m or less as measured by means of laser diffraction particle size analysis. The present invention also provides a process for producing the ultrafine particulate titanium oxide.

18 Claims, 1 Drawing Sheet

U.S. PATENT DOCUMENTS

| | | | | |
|---|---|---|---|---|
| 2,367,118 | A | * | 1/1945 | Heinen ........................ 423/613 |
| 2,462,978 | A | * | 3/1949 | Krchma et al. .............. 423/613 |
| 2,957,753 | A | | 10/1960 | Nelson et al. |
| 5,698,177 | A | | 12/1997 | Pratsinis et al. |
| 6,906,001 | B1 | * | 6/2005 | Escaffre et al. ............. 502/242 |
| 2001/0043904 | A1 | | 11/2001 | Tanaka et al. |
| 2002/0131929 | A1 | | 9/2002 | Tanaka et al. |

FOREIGN PATENT DOCUMENTS

| | | |
|---|---|---|
| JP | 3-252315 A | 11/1991 |
| JP | 6-340423 A | 12/1994 |
| JP | 7-316536 A | 12/1995 |
| JP | 10-505316 | 5/1998 |
| JP | 10-251021 A | 9/1998 |
| JP | 10-255863 A | 9/1998 |
| JP | 2000-340269 A | 12/2000 |
| JP | 2001-39704 A | 2/2001 |
| JP | 2001-151509 A | 6/2001 |
| WO | WO 96/06803 A1 | 3/1996 |
| WO | WO 01/23305 A1 | 4/2001 |

OTHER PUBLICATIONS

K. Hashimoto, et al., "Sanka Chitan Hikari shokubai no subete", CMC Publishing Co., pp. 29-31, 1998.

M. Graezel, "A low-cost, high efficiency solar cell based on dye-sensitized colloidal $TiO_2$ films", Nature, vol. 353, pp. 737-740, 1991.

M. Kiyono, "Titanium Oxide", Gihodo Co., p. 129, 1991.

S. Saito, "Ultrafine Particle Handbook", Fujitec Corporation p. 388, 1990.

Go, et al., "Property Control of High Purity Titanium Dioxide by Vapor Phase Oxidation Process," *Kagaku Kogaku Ronbunshu* 22(5):1167-1173 (1996).

Xia, et al., "Low temperature vapor-phase preparation of $TiO_2$ nanopowders," *J. Materials Science* 34:3505-3511(1999).

* cited by examiner

ULTRAFINE PARTICULATE TITANIUM OXIDE WITH LOW CHLORINE AND LOW RUTILE CONTENT, AND PRODUCTION PROCESS THEREOF

CROSS REFERENCE TO RELATED APPLICATION

This application is the National Stage of International Application No. PCT/JP03/02673, filed Mar. 6, 2003, which claims the benefit under 35 U.S.C. §119(e) of U.S. Provisional Application No. 60/363,305, filed Mar. 11, 2002, and which claims foreign priority of Japanese Patent Application No. 2002-060541, filed Mar. 6, 2002.

FIELD OF THE INVENTION

The present invention relates to ultrafine particulate titanium oxide of low chlorine content and low rutile content (hereinafter may be referred to as "low-chlorine, low-rutile ultrafine particulate titanium oxide") which is suitable as an additive for silicone rubber and is suitable for use in, for example, photocatalysts, solar cells, and dielectric materials; and to a process for producing the titanium oxide. More particularly, the present invention relates to low-halogen, low-rutile ultrafine particulate titanium oxide which is obtained through vapor-phase oxidation of a titanium halogenide-containing gas by an oxidative gas at high temperature, which has a low halogen content, which enables residual halogen to be readily removed therefrom, and which exhibits excellent dispersibility; and to a process for producing the titanium oxide.

BACKGROUND

Ultrafine particulate titanium oxide has been widely employed as, for example, an ultraviolet shielding material, an additive for silicone rubber, a dielectric raw material, and a component of a cosmetic composition (as used herein, the expression "titanium oxide," which is commonly used to represent oxides of titanium, encompasses "titanium dioxide" as specified in Japanese Industrial Standards (JIS)). Titanium oxide is also employed in, for example, photocatalysts and solar cells.

Titanium oxide assumes any of the following three crystal forms: rutile, anatase, and brookite. Anatase- or brookite-type titanium oxide, which exhibits excellent photoelectrochemical activity, is employed in photocatalysts and solar cells, rather than rutile-type titanium oxide.

By virtue of its photocatalytic activity, titanium oxide is employed in, for example, antibacterial tile, self-cleaning structural materials, and deodorant fibers for decomposition of organic substances. The mechanism by which titanium oxide decomposes organic substances is as follows. Titanium oxide absorbs ultraviolet rays, to thereby generate electrons and holes therein. The thus-generated holes react with water adsorbed onto titanium oxide, to thereby form hydroxy radicals. The thus-formed radicals decompose, into carbon dioxide gas and water, organic substances that have adsorbed onto the surfaces of titanium oxide particles ("*Hikari Kuriin Kakumei*" authored by Akira Fujishima, Kazuhito Hashimoto, and Toshiya Watanabe, CMC Publishing Co., Ltd., pp 143-145, (1997)). In titanium oxide exhibiting high photocatalytic activity, holes are readily generated, and the thus-generated holes readily reach the surface of the titanium oxide. According to "*Sanka Chitan Hikari Shokubai no Subete*" (edited by Kazuhito Hashimoto and Akira Fujishima, CMC Publishing Co., Ltd., pp 29-30, (1998)), anatase-type titanium oxide, titanium oxide having small amounts of lattice defects, or titanium oxide having small particle size and large specific surface area exhibits high photocatalytic activity.

Studies on application of titanium oxide to solar cells have been performed since 1991, when Graezel, et al. of Ecole Polytechnique Federale de Lausanne reported a dye-sensitized solar cell which employs titanium oxide in combination with a ruthenium-based dye (M. Graezel, Nature, 353, 737, (1991)). In the aforementioned dye-sensitized solar cell, titanium oxide serves as a dye carrier and as an n-type semiconductor, and is employed in a dye electrode bound to an electrically conductive glass electrode. The dye-sensitized solar cell has a structure such that an electrolyte layer is sandwiched between the dye electrode and a counter electrode. In the solar cell, electrons and holes are generated through absorption of light by the dye. The thus-generated electrons reach the electrically conductive glass electrode via a titanium oxide layer, and are discharged to the outside of the glass electrode. Meanwhile, the above-generated holes are conveyed to the counter electrode via the electrolyte layer, and are bound to the electrons supplied through the electrically conductive glass electrode. In order to improve properties of such a dye-sensitized solar cell, titanium oxide must be readily bound to a dye. Japanese Patent Application Laid-Open (kokai) No. 10-255863 describes that anatase-type titanium oxide is readily bound to a dye, and Japanese Patent Application Laid-Open (kokai) No. 2000-340269 describes that brookite-type titanium oxide is suitable for use in a dye-sensitized solar cell.

Functions of titanium oxide are more fully benefited from titanium oxide of high dispersibility. Titanium oxide of low dispersibility exhibits high hiding power. Therefore, when titanium oxide of low dispersibility is employed in a photocatalyst, a limitation is imposed on use of the photocatalyst. When titanium oxide of low dispersibility is employed in the field of solar cells, since such titanium oxide tends not to transmit light, the amount of light absorbed in the titanium oxide is lowered, whereby photoelectric conversion efficiency is lowered. In general, titanium oxide having a particle size of about ½ the wavelength of visible light exhibits maximum light scattering amount (hiding power), and the light scattering amount is lowered in accordance with a decrease in particle size ("Titanium Oxide" authored by Manabu Kiyono, Gihodo Co., Ltd., p. 129, (1991)). In many cases, titanium oxide having a primary particle size of some nm to some tens of nm is employed in the aforementioned technical field, and therefore, titanium oxide with excellent dispersibility scatters low amounts of light. However, titanium oxide exhibiting low dispersibility and having large size of aggregated particles exhibits increased light scattering.

Therefore, titanium oxide employed in the aforementioned technical field must exhibit high dispersibility, and thus ultrafine particulate titanium oxide of anatase- or brookite type, which exhibits high dispersibility, is employed in the art. Although not clearly defined, the primary particle size of ultrafine particles is generally about 0.1 μm or less.

In the case where titanium oxide is employed in a photocatalyst or a solar cell, when a corrosive component such as chlorine is present in the titanium oxide, a substrate is corroded or denatured. Therefore, the chlorine content of titanium oxide must be lowered. Desirably, the amount of Fe, Al, Si, or S in titanium oxide is reduced. For example, when the Fe content of titanium oxide is excessively high, the titanium oxide is colored, and the thus-colored titanium oxide is not suitable for use in a material requiring transparency. Meanwhile, when the amount of component of titanium oxide particles, such as Al or S, is excessively large, lattice defects are generated in the particles. When such titanium oxide particles are employed in a photocatalyst or a solar cell, functions thereof may be impaired.

Production processes for titanium oxide are roughly classified into two types: a liquid-phase process in which titanium tetrachloride or titanyl sulfate is hydrolyzed; and a vapor-phase process in which titanium tetrachloride is reacted with an oxidative gas such as oxygen or steam. Titanium oxide produced through the liquid-phase process contains anatase as a primary phase, but assumes the form of sol or slurry. A limitation is imposed on the use of titanium oxide in the form of sol or slurry. When such titanium oxide is to be employed in the form of powder, the titanium oxide must be dried and aggregation increases along with progress of drying a titanium oxide powder which has been wetted with a solvent ["Ultrafine Particle Handbook" edited by Shinroku Saito, Fujitec Corporation, p 388, (1990)]. When the titanium oxide powder is employed in, for example, a photocatalyst, the titanium oxide powder must be considerably crushed or pulverized in order to enhance its dispersibility. Such a pulverization treatment may cause contamination of the titanium oxide powder with wear products, along with variation in the particle size of the powder.

In general, titanium oxide produced through the vapor-phase process exhibits excellent dispersibility as compared with titanium oxide produced through the liquid-phase process, since a solvent is not employed in the vapor-phase process.

Various vapor-phase processes for producing titanium oxide ultrafine particles have been proposed. For example, Japanese Patent Application Laid-Open (kokai) No. 6-340423 discloses a process for producing titanium oxide through hydrolysis of titanium tetrachloride in flame, in which proportions by mol of oxygen, titanium tetrachloride, and hydrogen are regulated, and reaction of these materials is allowed to proceed, to thereby produce titanium oxide of high rutile content. Japanese Patent Application Laid-Open (kokai) No. 7-316536 discloses a process for producing a crystalline transparent titanium oxide powder having an average primary particle size of 40 nm to 150 nm, in which titanium tetrachloride is hydrolyzed at high temperature in a vapor phase, followed by rapid cooling of the resultant reaction product, wherein the flame temperature and the concentration of titanium in a raw material gas are specified. However, fine particulate titanium oxide produced through any of the above processes has high rutile content, and thus is not suitable for use in a photocatalyst or a solar cell.

Japanese Patent Application Laid-Open (kokai) No. 3-252315 discloses a vapor-phase process for producing titanium oxide containing anatase as a primary phase, in which the ratio of hydrogen in a gas mixture of oxygen and hydrogen is varied during the course of vapor-phase reaction, to thereby regulate the rutile content of the resultant titanium oxide. According to this publication, titanium oxide produced through the above process has a rutile content of 9%. However, titanium oxide disclosed in this publication has a particle size of 0.5 to 0.6 µm, which is larger than that of a typical ultrafine particle.

Ultrafine particulate titanium oxide is readily produced through a vapor-phase process employing titanium halogenide as a raw material, but halogen derived from the raw material remains in the resultant titanium oxide. Therefore, in many cases, the titanium oxide must be subjected to dehalogenation by means of heating, washing with water, or a similar technique. However, when the ultrafine particulate titanium oxide is heated in order to lower the chlorine content, sintering of titanium oxide particles proceeds, whereby the specific surface area of the titanium oxide tends to be reduced. In addition, such heating treatment may transform the crystal form of the titanium oxide from anatase to rutile. In order to prevent reduction of the specific surface area and such anatase-to-rutile transformation, the titanium oxide must be subjected to low-temperature heating or short-term heating. However, in such a case, sufficient dehalogenation of the titanium oxide fails to be attained. Japanese Patent Application Laid-Open (kokai) No. 10-251021 discloses a process for lowering the chlorine content of ultrafine particulate titanium oxide. In this process, titanium oxide is brought into contact with steam while the titanium oxide is rotated in a cylindrical rotatable heating furnace, to thereby lower the chlorine content. The titanium oxide described in this publication has a rutile content as high as 15%.

When titanium oxide particles are subjected to dehalogenation by means of, for example, washing with water, halogen remaining on the surfaces of the particles can be removed. However, halogen present in the interior of the particles tends not to be removed, since difficulty is encountered in bringing the halogen into contact with water.

As described above, low-chlorine, low-rutile ultrafine particulate titanium oxide cannot be produced through conventional vapor-phase processes.

In view of the foregoing, an object of the present invention is to provide low-halogen, low-rutile ultrafine particulate titanium oxide which is produced through a vapor-phase process and which exhibits excellent dispersibility. Another object of the present invention is to provide a process for producing the titanium oxide.

SUMMARY OF THE INVENTION

In order to attain the above objects, the present inventors have performed extensive studies, and have found that low-halogen, low-rutile ultrafine particulate titanium oxide exhibiting excellent dispersibility can be produced through a vapor-phase process. The present invention has been accomplished on the basis of this finding.

The present invention provides ultrafine particulate titanium oxide having a rutile content as low as 5% or less and a large BET specific surface area and exhibiting specific properties, which is produced through a vapor-phase process in which a titanium halogenide-containing gas is reacted with an oxidative gas (for example, oxygen, steam, or a gas mixture containing oxygen and steam) while the heating temperature and the heating time are controlled, followed by dehalogenation. The present invention also provides a process for producing the titanium oxide.

Accordingly, the present invention provides the following.
(1) A titanium oxide produced through reaction between a titanium halide-containing gas and an oxidative gas, characterized in that the rutile content of the titanium oxide is 5% or less, and that the specific surface area of the titanium oxide as measured by means of a BET one-point method; i.e., B (m$^2$/g), and the chlorine content of the titanium oxide; i.e., C (mass ppm), satisfy the following relation: $C \leq 650e^{0.028}$, and in that, when an aqueous suspension containing the titanium oxide in an amount of 1 mass % is allowed to stand at 20° C. for 30 minutes, the amount of halogen which is transferred from the titanium oxide to a liquid phase is at least 80 mass % on the basis of the entire amount of halogen contained in the titanium oxide.
(2) A titanium oxide according to (1) above, wherein the amount of halogen which is transferred from the titanium oxide to a liquid phase is at least 90 mass % on the basis of the entire amount of halogen contained in the titanium oxide.

(3) A titanium oxide according to (1) or (2) above, which comprises Fe in an amount of 100 mass ppm or less, Al in an amount of 100 mass ppm or less, Si in an amount of 100 mass ppm or less, and S in an amount of 100 mass ppm or less.

(4) A titanium oxide according to any one of (1) through (3) above, which has a specific surface area of 10 to 200 m²/g.

(5) A titanium oxide according to any one of (1) through (4) above, which comprises anatase as a primary phase.

(6) A titanium oxide according to (5) above, which has an anatase content of at least 90%.

(7) A titanium oxide according to any one of (1) through (4) above, which comprises brookite as a primary phase.

(8) A titanium oxide according to (7) above, which has a brookite content of at least 90%.

(9) A titanium oxide according to any one of (1) through (8) above, which has a 90% cumulative mass particle size of 2.5 μm or less as measured by use of a laser diffraction particle size analyzer.

(10) A titanium oxide according to any one of (1) through (9) above, wherein said titanium halogenide is titanium tetrachloride and said halogen is chlorine.

(11) A vapor-phase process for producing a titanium oxide, comprising reacting a titanium halogenide-containing gas with an oxidative gas, characterized in that, when the titanium halogenide-containing gas and the oxidative gas are introduced into a reactor, to thereby allow reaction to proceed, the temperature of the interior of the reactor is at least 800° C. but less than 1,100° C.

(12) A process for producing a titanium oxide according to (11) above, wherein the residence time of the titanium halogenide-containing gas and the oxidative gas in the reactor at temperature range of at least 800° C. but less than 1,100° C. is 0.1 seconds or less.

(13) A process for producing a titanium oxide according to (11) or (12) above, wherein each of the titanium halogenide-containing gas and the oxidative gas is preliminarily heated at a temperature of at least 600° C. but less than 1,100° C. before being introduced into the reactor.

(14) A process for producing a titanium oxide according to any one of (11) through (13) above, wherein reaction is performed by use of a raw material gas mixture containing titanium halogenide and an inert gas at a ratio of 1:0.1-20 by mol, and also by use of an oxidative gas whose amount is 1 to 30 mol on the basis of 1 mol of the titanium halogenide.

(15) A process for producing a titanium oxide according to any one of (11) through (14) above, wherein the oxidative gas is an oxygen gas containing water steam.

(16) A process for producing a titanium oxide according to (15) above, wherein the oxidative gas contains steam in an amount of at least 0.1 mol per 1 mol of an oxygen gas.

(17) A process for producing a titanium oxide according to any one of (11) through (16) above, wherein said titanium halogenide is titanium tetrachloride.

(18) A process for producing a titanium oxide characterized by comprising dehalogenating titanium oxide produced by the process as set forth in any one of (11) through (17) above by means of a dry dehalogenation method.

(19) A process for producing a titanium oxide according to (18) above, wherein, in the dry dehalogenation method, titanium oxide is heated to 200 to 500° C.

(20) A process for producing a titanium oxide according to (18) above, wherein, in the dry dehalogenation method, a steam-containing gas is heated to 200 to 1,000° C., and is brought into contact with titanium oxide.

(21) A process for producing a titanium oxide according to (20) above, wherein the steam-containing gas is air containing steam in an amount of at least 0.1 vol. %.

(22) A process for producing a titanium oxide according to (20) above, wherein the ratio by mass of the steam to the titanium oxide is at least 0.01.

(23) A process for producing a titanium oxide characterized by comprising dehalogenating titanium oxide produced by the method as set forth in any one of (11) through (17) above by means of a wet dechlorination method, to thereby yield a slurry containing a titanium oxide.

(24) A process for producing a titanium oxide according to (23) above, wherein, in the wet dehalogenation method, titanium oxide is suspended in water, and halogen which is transferred to a liquid phase is discharged to the outside of the resultant suspension.

(25) A process for producing a titanium oxide according to (23) or (24) above, wherein, in the wet dehalogenation method, separation of chlorine is performed by use of an ultrafiltration membrane.

(26) A process for producing a titanium oxide according to (23) or (24) above, wherein, in the wet dehalogenation method, separation of chlorine is performed by use of a reverse osmosis membrane.

(27) A process for producing a titanium oxide according to (23) or (24) above, wherein, in the wet dechlorination method, separation of chloride is performed by use of a filter press.

(28) A powder characterized by comprising a titanium oxide produced by a method as recited in any one of (11) to (27) above.

(29) A slurry characterized by comprising a titanium oxide produced by a method as recited in any one of (11) through (27) above.

(30) A composition characterized by comprising a titanium oxide produced by a method as recited in any one of (11) through (27) above.

(31) A photocatalytic material characterized by comprising a titanium oxide produced by a method as recited in any one of (11) through (27) above.

(32) A material for a wet solar cell characterized by comprising a titanium oxide produced by a method as recited in any one of (11) through (27) above.

(33) A dielectric raw material characterized by comprising a titanium oxide produced by a method as recited in any one of (11) through (27) above.

(34) A silicone rubber additive characterized by comprising a titanium oxide produced by a method as recited in any one of (11) through (27) above.

(35) A titanium oxide characterized in that the rutile content of the titanium oxide is 5% or less, the specific surface area as measured by means of a BET one-point method of the titanium oxide is 10 to 200 m²/g, the 90% cumulative mass particle size measured by a laser diffraction particle size analyzer of the titanium oxide is 2.5 μm or less, and the specific surface area of the titanium oxide as measured by means of a BET one-point method; i.e., $B$ (m²/g), and the halogen content of the titanium oxide; i.e., $C_i$ (mass ppm), satisfy the following relation; $0 \leq C_i \leq 650 \text{ k}e^{0.02B}$ wherein k is 0.20.

(36) A titanium oxide according to (35) above, wherein the relation $10 < C_i \leq 650 \text{ k}e^{0.02B}$ wherein k is 0.15, is satisfied.

MODES FOR CARRYING OUT THE INVENTION

Figure 1:
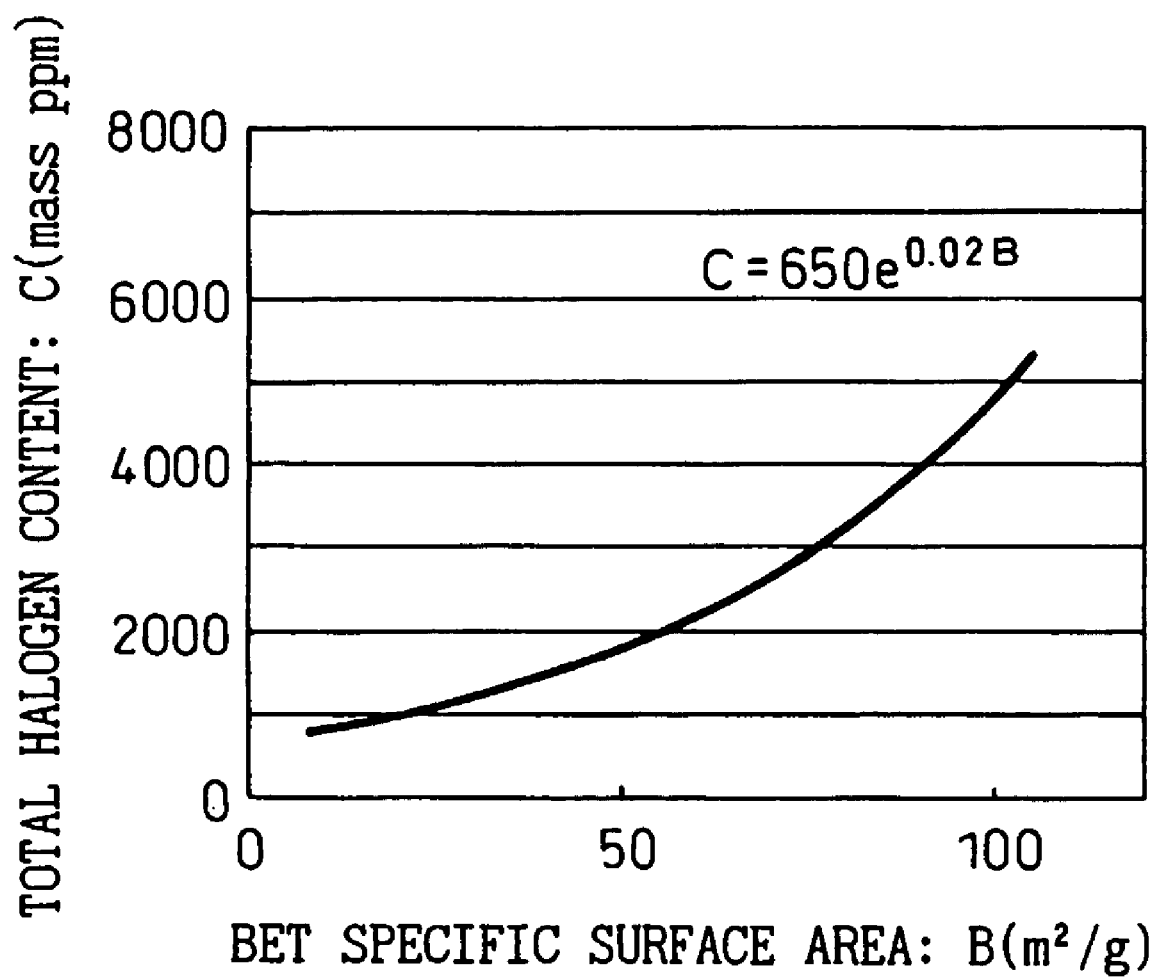
FIG. 1 shows the relation between halogen content and BET specific surface area of ultrafine particulate titanium oxide.

The titanium halogenide as the starting material for the titanium oxide of the present invention is preferably titanium chloride, particularly titanium tetrachloride since they are commercially easily available. Accordingly, in the following, the present invention is described with reference to a typical example wherein the halogen is chlorine, but the present invention may be applied to the cases wherein the halogen is bromine or iodine.

The ultrafine particulate titanium oxide of low rutile content of the present invention contains almost no chlorine in the interior of each particle, although it is produced using titanium tetrachloride in a gas-phase method. Chlorine remaining in the interior of titanium oxide particles may diffuse toward the surfaces thereof with passage of time, to thereby corrode or denature a substrate. Since difficulty is encountered in removing chlorine remaining in the interior of titanium oxide particles by means of a simple dechlorination treatment such as washing with water or drying. Therefore it is preferred that, chlorine is not present inside the interior of the particles.

The proportion of chlorine contained in the interior of titanium oxide particles based on the total amount of chlorine present on the surface of and in the particles is determined on the basis of the ratio of the amount of chlorine extracted from the particles with pure water (hereinafter simply referred to as "water-extracted chlorine") to the entire amount of chlorine contained in the particles. Specifically, the chlorine amount is calculated by the following formula (1):

$$R = WCL/TCL \times 100 \quad (1)$$

(wherein R represents the percent of chlorine present on the surfaces of titanium oxide particles (%), WCL represents the amount of water-extracted chlorine contained in the particles (mass %), and TCL represents the entire amount of chlorine contained in the particles (mass %)). The greater the R value, the smaller the amount of chlorine contained in the interior of the titanium oxide particles. In the titanium oxide of the present invention, R is preferably at least 80%, more preferably at least 90%.

A characteristic feature of the ultrafine particulate titanium oxide of the present invention, which is produced from titanium tetrachloride through a vapor-phase process, resides in that the titanium oxide may have a rutile content of 5% or less (hereinafter may be simply referred to as "low-rutile ultrafine particulate titanium oxide"), and in that the titanium oxide may satisfy the relation represented by the following formula (2):

$$C \leq 650 \times e^{0.02B}, \quad (2)$$

not only after a dechlorination step but also in some cases even before a dechlorination step. The rutile content is calculated from the peak height corresponding to rutile crystals as measured through X-ray diffractometry; i.e., Hr, the peak height corresponding to anatase crystals as measured through X-ray diffractometry; i.e., Ha, and the peak height corresponding to Brookite crystals as measured through x-ray diffractometry; i.e., Hb; specifically, the rutile content is calculated by use of the following formula: rutile content=100× Hr/(Hr+Ha+Hb). In formula (2), C represents the entire amount of chlorine (mass %) in the titanium oxide. For example, C is calculated through the following procedure: a hydrofluoric acid aqueous solution is added to titanium oxide, and the titanium oxide is dissolved in the solution under microwave heating; the resultant solution is subjected to measurement by means of a potentiometric titration method employing silver nitrate, to thereby obtain the mass of chlorine contained in the titanium oxide; and the thus-obtained chlorine mass is divided by the mass of the employed titanium oxide. In formula (2), B represents a BET specific surface area ($m^2/g$) falling within a range of 10 to 200 $m^2/g$).

The low-rutile ultrafine particulate titanium oxide of the present invention satisfies the relation of the aforementioned formula (2) shown in FIG. 1, having a low total chlorine content, and has a high R as represented by the aforementioned formula (1), having a low chlorine content inside the particles. Conventional ultrafine particulate titanium oxide produced from titanium tetrachloride through a vapor-phase process has a low rutile content. However, in the case of such conventional titanium oxide, the chlorine contents corresponding to the BET specific surface areas are plotted in the region above the curve of FIG. 1 represented by the formula: $C = 650 \times e^{0.02B}$, and the chlorine content inside the particles is high. Particularly, as the surface area of titanium oxide increase, dechlorination is more difficult and the content of chlorine tends to increase exponentially.

The low-rutile ultrafine particulate titanium oxide of the present invention satisfies the relation between the chlorine content and the BET specific surface area represented by formula (2), and has a BET specific surface area of normally 10 to 200 $m^2/g$, preferably 40 to 200 $m^2/g$, more preferably 45 to 120 $m^2/g$.

The low-rutile ultrafine particulate titanium oxide of the present invention has a content of each of Fe, Al, Si and S of preferably 100 mass ppm or less, more preferably 0.1 to 100 mass ppm, more preferably 0.1 to 50 mass ppm, are particularly 0.1 to 10 mass ppm.

The contents of less than 0.1 ppm of these impurities can be attained by using high purity starting materials and highly corrosion resistant reactor and other equipment. It is economically advantageous that the contents of each impurity be made less than 0.1 mass ppm in normal applications of titanium oxide of the present invention.

A characteristic feature of the low-rutile titanium oxide of the present invention resides in its high dispersibility. In the present invention, dispersibility is determined on the basis of particle size distribution as obtained through laser diffraction particle size distribution analysis. According to "Ultrafine Particle Handbook" (edited by Shinroku Saito, Fujitec Corporation, p. 93, (1990)), dispersibility can be determined through, for example, the precipitation method, microscopy, light scattering, or the direct count method. Of these, the precipitation method and the direct count method are not suitable for determination of dispersibility of ultrafine particles, since the particle size which can be measured through each of the methods is limited to some hundreds of nm or more. Microscopy is also not preferred, in consideration that measurements may vary depending on the sampling process of a sample to be measured or the preliminary treatment of the sample. In contrast, the light scattering method is suitable for measurement of ultrafine particles, since it can measure a particle size falling within a range of some nm to some μm. A procedure for measuring particle size distribution will next be described.

Pure water (50 ml) and a 10% sodium hexametaphosphate aqueous solution (100 μl) are added to titanium oxide (0.05 g)

to thereby prepare a slurry, and the slurry is irradiated with ultrasonic waves (46 KHz, 65 W) for three minutes. The resultant slurry is subjected to measurement by a laser diffraction particle size distribution analyzer (model: SALD-2000J, product of Shimadzu Corporation), to thereby measure the particle size distribution of the titanium oxide. When the 90% cumulative mass particle size (hereinafter may be simply referred to as "D90") of the thus-measured particle size distribution is small, the titanium oxide is considered to exhibit excellent dispersibility to a hydrophilic solvent. The 50% cumulative mass particle size may be employed for determination of dispersibility. However, in this case, aggregated particles exhibiting low dispersibility are difficult to detect. The ultrafine particulate titanium oxide of the present invention preferably has a D90 of 2.5 µm or less.

The ultrafine particulate titanium oxide of the present invention may be incorporated into various compositions as a raw material, a pigment, or a particulate component exerting a photocatalytic effect. For example, the titanium oxide may be employed as a raw material or an additive in a variety of products, including cosmetic compositions, ultraviolet shielding materials, dielectric materials, silicone rubber, and solar cells.

The production process for the titanium oxide will next be described.

In a generally known vapor-phase process for producing titanium oxide, titanium tetrachloride is oxidized by use of an oxidative gas such as oxygen or steam at about 1,000° C., to thereby yield fine particulate titanium oxide.

In order to produce ultrafine particulate titanium oxide through a vapor-phase process, the growth time (growth zone) of particles must be shortened. Specifically, when cooling or dilution is performed immediately after reaction to thereby shorten the high-temperature residence time of titanium oxide particles, growth of the particles attributed to, for example, sintering can be prevented. When the high-temperature residence time of titanium oxide particles is shortened, thermal transformation from anatase to rutile can be prevented, thereby yielding particles of high anatase content.

In general, titanium oxide produced from titanium tetrachloride through a vapor-phase process contains chlorine in an amount of 0.1 to 2 mass %. The surfaces of anatase-type titanium oxide particles have points to which an element such as chlorine can be bound (density: 13 points/nm$^2$) (the aforementioned "Titanium Oxide" authored by Manabu Seino). When all the points are bound to chlorine, the amount of chlorine remaining on the surfaces of the titanium oxide particles is theoretically obtained by the following formula (3):

$$Y=0.077 \times A \quad (3)$$

(wherein Y represents the amount of chlorine remaining on the surfaces of titanium oxide particles (mass %), and A represents the specific surface area of the particles (m$^2$/g)). For example, when titanium oxide particles have a specific surface area of 100 m$^2$/g, the amount of chlorine remaining on the surfaces of the particles is calculated as about 8 mass % according to formula (3).

In a practical reaction process, chlorine is substituted by an oxidative gas, and the amount of chlorine is equilibrated, because of the difference in chlorine content between the surfaces of titanium oxide particles and a vapor phase, so that the chlorine content of the titanium oxide particles may become somewhat lower than the value calculated by the aforementioned formula (3). However, when the high-temperature residence time of titanium oxide is shortened in the reaction process, oxidation of titanium tetrachloride is not completed, thereby possibly increasing the amount of partially chlorinated titanium oxide. When chlorine remains in the interior of titanium oxide particles; i.e., when the amount of chlorine contain in the interior of the particles increases, high-temperature or long-term heating treatment is required for removing chlorine from the particles, and as a result, the specific surface area of the particles is reduced. Conventional ultrafine particulate titanium oxide produced through a vapor-phase process has high anatase content but high chlorine content, or has low chlorine content but low anatase content.

The present inventors have found that, in a vapor-phase process for producing titanium oxide through reaction (high-temperature oxidation) between a titanium-tetrachloride-containing gas and an oxidative gas, when a titanium tetrachloride-containing gas which has been heated to a temperature of at least 600° C. but less than 1,100° C. and an oxidative gas which has been heated to a temperature of at least 600° C. but less than 1,100° C. are fed to a reaction tube, to thereby allow reaction to proceed, and the resultant titanium oxide is held within the reaction tube for 0.1 seconds or less at a temperature of at least 800° C. but less than 1,100° C. and then subjected to dechlorination, low-entire chlorine and particularly low-particle interior chlorine, low-rutile ultrafine particulate titanium oxide having high BET specific surface area can be produced; and when the above produced titanium oxide is further subjected to a dechlorination step, lower-entire chlorine and low particle interior chlorine, low-rutile ultrafine particulate titanium oxide can be obtained.

Dechlorination of titanium oxide is performed by means of a dry method or a wet method. In a dry dechlorination method, for example, titanium oxide is heated by use of a heating apparatus, to thereby remove chlorine from the titanium oxide. Examples of the heating apparatus employed in the dry dechlorination method include, but are not limited to, a cylindrical rotatable heating furnace, a hot-air circulation heating furnace, a flow drying furnace, and a stirring drying furnace. In a wet dechlorination method, for example, titanium oxide is suspended in pure water, and chlorine which is transferred to a liquid phase is discharged to the outside of the resultant suspension. After chlorine is discharged to the outside of the suspension, the resultant titanium oxide may be dried.

The temperature of the interior of a reaction tube to which a titanium tetrachloride-containing gas and an oxidative gas are fed is preferably at least 800° C. but less than 1,100° C., more preferably at least 900° C. but less than 1,000° C. When the temperature of the interior of the reaction tube is increased, reaction between these gases is completed simultaneous with mixing of these gases, thereby promoting uniform nucleus generation and reducing the zone of reaction (CVD). When the temperature of the interior of the reaction tube is lower than 800° C., titanium oxide of high anatase content is readily produced, but reaction proceeds incompletely, and thus chlorine remains in the interior of the resultant titanium oxide particles. In contrast, when the temperature of the interior of the reaction tube is 1,100° C. or higher, anatase-to-rutile transformation or growth of particles proceeds, and thus low-rutile ultrafine particulate titanium oxide fails to be produced.

When a raw material gas is fed to a reaction tube, reaction (exothermic reaction) proceeds, and a reaction zone having a temperature higher than 1,100° C. is formed within the tube. Although a certain amount of heat is released from the reaction tube, if rapid cooling of the tube is not performed, titanium oxide particles continue to grow, and the crystal form of the particles is transformed to rutile. Therefore, in the present invention, the high-temperature resistance time of titanium oxide particles at a temperature of at least 800° C. but less than 1,100° C. is preferably regulated to 0.1 seconds or less, more preferably 0.005 to 0.1 seconds, particularly 0.01 to 0.05 seconds. When the high-temperature residence time exceeds 0.1 seconds, anatase-to-rutile transformation or sintering of the particles proceeds. When the high-temperature residence time is less than 0.005 seconds, the oxidation reaction time of titanium tetrachloride becomes short and the reaction should be conducted under the conditions in which oxidation is accelerated, for example, using an excess amount of oxygen in comparison with titanium tetrachloride. If oxidation is not sufficient, the residual chlorine inside the particles may increase.

Rapid cooling of the reaction tube is performed by means of, for example, a method in which a large amount of gas, such as cooling air or nitrogen, is introduced into the reaction mixture, or a method in which water is sprayed to the reaction tube.

When the temperature of the interior of the reaction tube is regulated to at least 800° C. but less than 1,100° C., ultrafine particulate titanium oxide having low chlorine content can be produced. When the high-temperature residence time is regulated to 0.1 seconds or less, anatase-to-rutile transformation and growth of particles can be prevented.

In order to regulate the temperature of the interior of the reaction tube to at least 800° C. but less than 1,100° C., the heating temperature of the raw material gas is preferably regulated to 600° C. to 1,100° C. inclusive. The thus-heated raw material gas undergoes reaction in the reaction tube, to thereby generate heat. However, when the temperature of the raw material gas is lower than 600° C., the temperature of the interior of the reaction tube tends not to become 800° C. or higher. In contrast, when the temperature of the raw material gas is 1,100° C. or higher, although a certain amount of heat is released from the reaction tube, the temperature of the interior of the tube tends to exceed 1,100° C.

In the raw material gas containing titanium tetrachloride, the amount of an inert gas is preferably 0.1 to 20 mol, more preferably 4 to 20 mol, on the basis of 1 mol of titanium tetrachloride gas. When the amount of the inert gas falls below the above range, the density of titanium oxide particles in the reaction zone increases, and aggregation or sintering of the particles tends to occur, whereby ultrafine particulate titanium oxide may fail to be produced. In contrast, when the amount of the inert gas exceeds the above range, reactivity is lowered, and the yield of titanium oxide is reduced.

The oxidative gas should contain oxygen. The amount of an oxygen gas to be reacted with the titanium tetrachloride-containing raw material gas is preferably 1 to 30 mol, more preferably 5 to 30 mol, on the basis of 1 mol of titanium tetrachloride. When the amount of the oxygen gas is increased, large amounts of nuclei are generated, and ultrafine particulate titanium oxide is readily produced. However, even when the amount of the oxygen gas is increased so as to exceed 30 mol, the amount of nuclei to be generated no longer increases. Therefore, from the viewpoint of economy, an upper limit is imposed on the amount of the oxygen, although properties of the resultant titanium oxide do not vary even when the amount of the oxygen gas exceeds 30 mol. When the amount of the oxygen gas is insufficient with respect to that of titanium tetrachloride, oxygen defects in the resultant titanium oxide increase in number, and the titanium oxide is colored. The oxidative gas may contain steam in addition to oxygen.

The oxidative gas may be any of, for example, oxygen, steam-containing oxygen, air, a mixed gas thereof with an inert gas such as nitrogen or argon, but is preferably oxygen containing steam (water steam) since the reaction temperature can be easily controlled.

Dechlorination of titanium oxide through heating is preferably performed at a heating temperature of 200° C. to 500° C. while titanium oxide powder is brought into contact with steam, such that the ratio by mass of water to titanium oxide (i.e., the mass of steam/the mass of titanium oxide, the same shall apply hereinafter) is 0.01 or more. More preferably, dechlorination of titanium oxide is performed under the following conditions: mass ratio of water to titanium oxide: 0.04 or more, heating temperature: 250° C. to 450° C. When the heating temperature exceeds 500° C., sintering of titanium oxide particles proceeds, and growth of the particles occurs, whereas when the heating temperature is lower than 200° C., efficiency in dechlorination is considerably lowered. Dechlorination proceeds through substitution of chlorine on the surfaces of titanium oxide particles by water present in the vicinity of the particles or by hydroxyl groups present on the surfaces of adjacent particles. In the case where chlorine on the surfaces of titanium oxide particles is substituted by water, dechlorination proceeds without growth of the particles. Meanwhile, in the case where chlorine on the surfaces of titanium oxide particles is substituted by hydroxyl groups present on the surfaces of adjacent particles, dechlorination proceeds simultaneously with growth of the particles. Particularly, titanium oxide having a larger surface area may more easily grain grow since the possibility of substitution reaction with hydroxide on the surface of adjacent particles increases. Therefore, when dechlorination is performed while growth of particles is suppressed, regulation of the mass ratio of water to titanium oxide becomes critical. When the mass ratio of water to titanium oxide is preferably 0.01 or more, growth of particles can be suppressed.

Preferably, steam with which titanium oxide is brought into contact is mixed with a gas capable of discharging chlorine removed from the titanium oxide to the outside at high efficiency. Examples of such a gas include air. When air is employed, the amount of steam contained therein is preferably at least 0.1 vol. %, more preferably at least 5 vol. %, much more preferably at least 10 vol. %. Air containing steam is preferably heated to 200° C. to 1,000° C.

Since the low-rutile ultrafine particulate titanium oxide of the present invention contains almost no chlorine in the interior of each particle, the chlorine content of the titanium oxide may be reduced by means of a wet method. In a wet dechlorination method, for example, the titanium oxide is suspended in water, and chlorine which transfers to a liquid phase is discharged to the outside of the resultant suspension by use of an ultrafiltration membrane, a reverse osmosis membrane, or a filter press.

The low-rutile, low-entire halogen, particularly low-particle interior halogen, ultrafine titanium oxide of the present invention can provide low-rutile ultrafine titanium oxide having a very low entire halogen content in relation to the BET specific surface area, preferably by removing halogen on the surface of particle more completely.

The low-rutile, low-entire halogen and low-interior halogen, ultrafine titanium oxide of the present invention is characterized in that the rutile content of the titanium oxide is 5% or less, the specific surface area as measured by means of a BET one-point method of the titanium oxide is 10 to 200 $m^2/g$, the 90% cumulative mass particle size measured by a laser diffraction particle size analyzer of the titanium oxide is 2.5 μm or less, and the specific surface area of the titanium oxide as measured by means of a BET one-point method; i.e., B ($m^2/g$), and the halogen content in the interior of the titanium oxide particles; i.e., $C_i$ (mass ppm), satisfy the following relation: $0 < C_i \leq 650 \, k e^{0.02B}$ wherein k is 0.20, more preferably $10 < C_i \leq 650 \, k e^{0.02B}$ wherein k is 0.20, further preferably $10 < C_i \leq 650 \, k e^{0.02B}$ wherein k is 0.15.

EXAMPLES

The present invention will next be described in detail by way of Examples, which should not be construed as limiting the invention thereto.

Example 1

A diluted titanium tetrachloride gas which had been prepared by diluting gaseous titanium tetrachloride (11.8 Nm³/hr, wherein N refers to "normal state," the same shall apply hereinafter) with nitrogen gas (8 Nm³/hr) was preliminarily heated to 900° C. Separately, an oxidative gas which had been prepared by mixing oxygen (8 Nm³/hr) with steam (32 Nm³/hr) was preliminarily heated to 800° C. These raw material gases were introduced into a quartz-glass-made reaction tube. Cooling air was introduced into the reaction tube such that the residence time of the raw material gasses at a temperature of at least 800° C. but less than 1,100° C. was 0.1 seconds, and subsequently the resultant ultrafine particulate titanium oxide powder was collected by use of a polytetrafluoroethylene-made bag filter.

The thus-obtained titanium oxide powder was cause to flow through a cylindrical rotatable heating furnace, and subjected to dechlorination under the following conditions: mass ratio of water to titanium oxide: 0.02, heating temperature: 450° C. The thus-dechlorinated titanium oxide powder was found to have a BET specific surface area of 22 m²/g, a rutile content of 1%, a water-extracted chlorine content of 900 mass ppm, and a total chlorine content of 1,000 mass ppm. The BET specific surface area was measured by use of a specific surface area measuring apparatus (model: Flow Sorb II, 2300, product of Shimadzu Corporation). The rutile content was calculated from the peak height corresponding to rutile crystals as measured through X-ray diffractometry; i.e., Hr, the peak height corresponding to anatase crystals as measured through X-ray diffractometry; i.e., Ha and the peak height corresponding to brookite crystals as measured through x-ray diffractometry; i.e., Hb. Specifically, the rutile content was calculated by use of the following formula: rutile content=100×Hr/(Hr+Ha+Hb). The amount of chlorine present on the surfaces of the titanium oxide powder (hereinafter simply referred to as "surface chlorine content") was calculated from the above-obtained water-extracted chlorine content (900 mass ppm) and total chlorine content (1,000 mass ppm) by use of the aforementioned formula (1), and was found to be greater than 80%. Total chlorine content was found to be lower than the value calculated from the above-obtained specific surface area (22 m²/g) by use of the aforementioned formula (2).

The 90% cumulative mass particle size (D90) of the above-obtained titanium oxide powder was measured by means of laser diffraction particle size distribution analysis, and was found to be 1.1 μm. Table 1 shows the analysis results, including rutile content, BET specific surface area, total chlorine content, surface chlorine content, D90, Fe content, Al content, Si content, and S content.

Example 2

A diluted titanium tetrachloride gas which had been prepared by diluting gaseous titanium tetrachloride (5.9 Nm³/hr) with nitrogen gas (30 Nm³/hr) was preliminarily heated to 1,000° C. Separately, an oxidative gas which had been prepared by mixing oxygen (4 Nm³/hr) with steam (16 Nm³/hr) was preliminarily heated to 1,000° C. These raw material gases were introduced into a quartz-glass-made reaction tube. Cooling air was introduced into the reaction tube such that the residence time of the raw material gasses at a temperature of at least 800° C. but less than 1,100° C. was 0.03 seconds, and subsequently the resultant ultrafine particulate titanium oxide powder was collected by use of a polytetrafluoroethylene-made bag filter.

The thus-obtained titanium oxide powder was fed to a hot-air circulation heating furnace, and subjected to dechlorination under the following conditions: mass ratio of water to titanium oxide: 0.04, heating temperature: 450° C. The thus-dechlorinated titanium oxide powder was found to have a BET specific surface area of 65 m²/g, a rutile content of 3%, a water-extracted chlorine content of 900 mass ppm, and a total chlorine content of 1,100 mass ppm. The surface chlorine content was calculated from the above-obtained water-extracted chlorine content (900 mass ppm) and total chlorine content (1,100 mass ppm) by use of the aforementioned formula (1), and was found to be greater than 80%. The total chlorine content was found to be lower than the value calculated from the above-obtained specific surface area (65 m²/g) by use of the aforementioned formula (2). The 90% cumulative mass particle size (D90) of the above-obtained titanium oxide powder was measured by means of laser diffraction particle size distribution analysis, and was found to be 1.9 μm. Table 1 shows the analysis results, including rutile content, BET specific surface area, total chlorine content, surface chlorine content, D90, Fe content, Al content, Si content, and S content.

Example 3

A diluted titanium tetrachloride gas which had been prepared by diluting gaseous titanium tetrachloride (4.7 Nm³/hr) with nitrogen gas (36 Nm³/hr) was preliminarily heated to 1,000° C. Separately, an oxidative gas which had been prepared by mixing air (36 Nm³/hr) with steam (25 Nm³/hr) was preliminarily heated to 1,000° C. These raw material gases were introduced into a quartz-glass-made reaction tube. Cooling air was introduced into the reaction tube such that the residence time of the raw material gasses at a temperature of at least 800° C. but less than 1,100° C. was 0.02 seconds, and subsequently the resultant ultrafine particulate titanium oxide powder was collected by use of a polytetrafluoroethylene-made bag filter.

The thus-obtained titanium oxide powder was fed to a hot-air circulation heating furnace, and subjected to dechlorination under the following conditions: mass ratio of water to titanium oxide: 0.06, heating temperature: 350° C. The thus-dechlorinated titanium oxide powder was found to have a BET specific surface area of 97 m²/g, a rutile content of 1%, a water-extracted chlorine content of 1,800 mass ppm, and a total chlorine content of 2,000 mass ppm. The surface chlorine content was calculated from the above-obtained water-extracted chlorine content (1,800 mass ppm) and total chlorine content (2,000 mass ppm) by use of the aforementioned formula (1), and was found to be greater than 80%. The total chlorine content was found to be lower than the value calculated from the above-obtained specific surface area (97 m²/g) by use of the aforementioned formula (2). The 90% cumulative mass particle size (D90) of the above-obtained titanium oxide powder was measured by means of laser diffraction particle size distribution analysis, and was found to be 2.2 μm.

Table 1 shows the analysis results, including rutile content, BET specific surface area, total chlorine content, surface chlorine content, D90, Fe content, Al content, Si content, and S content.

Comparative Example 1

A diluted titanium tetrachloride gas which had been prepared by diluting gaseous titanium tetrachloride (11.8 Nm$^3$/hr) with nitrogen gas (8 Nm$^3$/hr) was preliminarily heated to 900° C. Separately, an oxidative gas which had been prepared by mixing oxygen (8 Nm$^3$/hr) with steam (32 Nm$^3$/hr) was preliminarily heated to 800° C. These raw material gases were introduced into a quartz-glass-made reaction tube. Cooling air was introduced into the reaction tube such that the residence time of the raw material gasses at a temperature of at least 800° C. but less than 1,100° C. was 0.2 seconds, and subsequently the resultant ultrafine particulate titanium oxide powder was collected by use of a polytetrafluoroethylene-made bag filter.

The thus-obtained titanium oxide powder was caused to flow through a cylindrical rotatable heating furnace, and subjected to dechlorination under the following conditions: mass ratio of water to titanium oxide: 0.02, heating temperature: 450° C. The thus-dechlorinated titanium oxide powder was found to have a BET specific surface area of 19 m$^2$/g, a rutile content of 11%, a water-extracted chlorine content of 300 mass ppm, and a total chlorine content of 300 mass ppm. The surface chlorine content was calculated from the above-obtained water-extracted chlorine content (300 mass ppm) and total chlorine content (300 mass ppm) by use of the aforementioned formula (1), and was found to be greater than 80%. The total chlorine content was found to be lower than the value calculated from the above-obtained specific surface area (19 m$^2$/g) by use of the aforementioned formula (2). The 90% cumulative mass particle size (D90) of the above-obtained titanium oxide powder was measured by means of laser diffraction particle size distribution analysis, and was found to be 0.8 μm. Table 1 shows the analysis results, including rutile content, BET specific surface area, total chlorine content, surface chlorine content, D90, Fe content, Al content, Si content, and S content.

Comparative Example 2

A diluted titanium tetrachloride gas which had been prepared by diluting gaseous titanium tetrachloride (4.7 Nm$^3$/hr) with nitrogen gas (36 Nm$^3$/hr) was preliminarily heated to 800° C. Separately, an oxidative gas which had been prepared by mixing air (36 Nm$^3$/hr) with steam (25 Nm$^3$/hr) was preliminarily heated to 800° C. These raw material gases were introduced into a quartz-glass-made reaction tube. The temperature of the reaction tube was regulated to 750° C., and cooling air was introduced into the reaction tube such that the residence time of the raw material gasses was 0.08 seconds. Thereafter, the resultant ultrafine particulate titanium oxide powder was collected by use of a polytetrafluoroethylene-made bag filter.

The thus-obtained titanium oxide powder was fed to a hot-air circulation heating furnace, and subjected to dechlorination under the following conditions: mass ratio of water to titanium oxide: 0.04, heating temperature: 350° C. The thus-dechlorinated titanium oxide powder was found to have a BET specific surface area of 74 m$^2$/g, a rutile content of 2%, a water-extracted chlorine content of 2,800 mass ppm, and a total chlorine content of 3,900 mass ppm. The surface chlorine content was calculated from the above-obtained water-extracted chlorine content (2,800 mass ppm) and total chlorine content (3,900 mass ppm) by use of the aforementioned formula (1), and was found to be lower than 80%. The total chlorine content was found to be greater than the value calculated from the above-obtained specific surface area (74 m$^2$/g) by use of the aforementioned formula (2). The 90% cumulative mass particle size (D90) of the above-obtained titanium oxide powder was measured by means of laser diffraction particle size distribution analysis, and was found to be 3.6 μm. Table 1 shows the analysis results, including rutile content, BET specific surface area, total chlorine content, surface chlorine content, D90, Fe content, Al content, Si content, and S content.

Comparative Example 3

A diluted titanium tetrachloride gas which had been prepared by diluting gaseous titanium tetrachloride (5.9 Nm$^3$/hr) with nitrogen gas (30 Nm$^3$/hr) was preliminarily heated to 1,100° C. Separately, an oxidative gas which had been prepared by mixing oxygen (4 Nm$^3$/hr) with steam (16 Nm$^3$/hr) was preliminarily heated to 1,100° C. These raw material gases were introduced into a quartz-glass-made reaction tube. The temperature of the reaction tube was regulated to 1,200° C., and cooling air was introduced into the reaction tube such that the residence time of the raw material gasses was 0.04 seconds. Thereafter, the resultant ultrafine particulate titanium oxide powder was collected by use of a polytetrafluoroethylene-made bag filter.

The thus-obtained titanium oxide powder was fed to a hot-air circulation heating furnace, and subjected to dechlorination under the following conditions: mass ratio of water to titanium oxide: 0.06, heating temperature: 450° C. The thus-dechlorinated titanium oxide powder was found to have a BET specific surface area of 44 m$^2$/g, a rutile content of 12%, a water-extracted chlorine content of 1,200 mass ppm, and a total chlorine content of 1,300 mass ppm. The surface chlorine content was calculated from the above-obtained water-extracted chlorine content (1,200 mass ppm) and total chlorine content (1,300 mass ppm) by use of the aforementioned formula (1), and was found to be greater than 80%. The total chlorine content was found to be lower than the value calculated from the above-obtained specific surface area (44 m$^2$/g) by use of the aforementioned formula (2). The 90% cumulative mass particle size (D90) of the above-obtained titanium oxide powder was measured by means of laser diffraction particle size distribution analysis, and was found to be 1.2 μm. Table 1 shows the analysis results, including rutile content, BET specific surface area, total chlorine content, surface chlorine content, D90, Fe content, Al content, Si content, and S content.

Comparative Example 4

Commercially available titanyl sulfate (Kanto Chemical Company, 1st grade chemical) was boiled and the obtained precipitation was washed with pure water to obtain water-containing titanium oxide. The water-containing titanyl sulfate was added with pure water to form a slurry in order to remove the residual sufaic acid and, while stirring, the slurry was added with an aqueous ammonia solution to adjust pH to 5 and the stirring was continued for 12 hours. The slurry was concentrated by a ultrafiltration membrane to a concentration of 20% by mass. The concentrated slurry was again added with an aqueous ammonia solution to adjust pH to 5, stirring was effected for 12 hours, and ultrafiltration was conducted using a ultrafiltration membrane while adding pure water to obtain a titania sol. The obtained titania sol was dried at 300° C. for 2 hours to obtain a wet-method ultrafine titanium oxide.

The obtained titanium oxide has a BET specific surface area of 212 m²/g and, a rutile content of 1%. The water-extracted chlorine content are the total chlorine content of the titanium oxide were both mass ppm. The titanium oxide was disassociated with a crucible and the particle size distribution was measured by a laser diffraction particle size distribution analyer to have a 90% accumulative mass particle size D90 of 26.1 μm. The rutile content, BET specific surface, total chlorine content, surface chlorine content, D90, and analysis results of Fe, Al, Si and S, are shown is Table 1.

TABLE 1

|  |  | Example 1 | Example 2 | Example 3 | Comparative Example 1 | Comparative Example 2 | Comparative Example 3 | Comparative Example 4 |
|---|---|---|---|---|---|---|---|---|
| Rutile content | % | 1 | 3 | 1 | 11 | 2 | 12 | 1 |
| BET specific surface area | m²/g | 22 | 65 | 97 | 19 | 74 | 44 | 212 |
| Total chlorine content | mass ppm | 1,000 | 1,100 | 2,000 | 300 | 3,900 | 1,300 | <10 |
| Surface chlorine content | % | 90 | 91 | 90 | 100 | 72 | 92 | — |
| D90 | μm | 1.1 | 1.9 | 2.2 | 0.8 | 3.6 | 1.2 | 26.1 |
| Fe | mass ppm | <10 | <10 | <10 | <10 | <10 | <10 | 50 |
| Al | mass ppm | <10 | <10 | <10 | <10 | <10 | <10 | <10 |
| Si | mass ppm | <20 | <20 | <20 | <20 | <20 | <20 | <20 |
| S | mass ppm | <10 | <10 | <10 | <10 | <10 | <10 | 670 |

INDUSTRIAL APPLICABILITY

The present invention provides anatase-type ultrafine particulate titanium oxide produced through a vapor-phase process, which has low halogen content and exhibits excellent dispersibility as compared with conventional titanium oxide having a BET specific surface area comparable to that of the ultrafine particulate titanium oxide. When the ultrafine particulate titanium oxide is subjected to dehalogenation, the titanium oxide satisfies the relation between BET surface area (B) and halogen content (C) represented by the aforementioned formula (2). The ultrafine particulate titanium oxide has a D90 of 2.5 μm or less as measured by means of laser diffraction particle size analysis. The present invention also provides a process for producing the ultrafine particulate titanium oxide.

The titanium oxide of the present invention is suitable for use in photocatalysts and solar cells. Since the titanium oxide exhibits excellent dispersibility to an aqueous solvent, the titanium oxide can be suitably used for photocatalyst applications in water. The titanium oxide as a powder requires no pulverization process, or requires only a pulverization process employing very simple pulverization equipment. Therefore, the titanium oxide is very advantageously employed in practice in the industry.

The invention claimed is:

1. A vapor phase process for producing a titanium oxide comprising:
   preliminarily heating each of a titanium halogenide-containing gas and an oxidative gas at a temperature of at least 600° C. but less than 1,100° C. before introducing the titanium halogenide-containing gas and the oxidative gas into a reactor
   reacting the titanium halogenide-containing gas with the oxidative gas by introducing the titanium halogenide-containing gas and the oxidative gas into the reactor, to thereby allow reaction to proceed, with the temperature of the interior of the reactor being 900° C. to less than 1,000° C., and
   maintaining a residence time of the titanium halogenide-containing gas and the oxidative gas in the reactor at temperature range of 900° C. to less than 1,000° C. of 0.005 seconds to 0.05 seconds to obtain a low rutile titanium oxide having a rutile content of 5% or less.

2. A process for producing a titanium oxide according to claim 1, wherein reaction is performed by use of a raw material gas mixture containing titanium halogenide and an inert gas at a ratio of 1:0.1-20 by mol, and also by use of an oxidative gas whose amount is 1 to 30 mol on the basis of 1 mol of the titanium halogenide.

3. A process for producing a titanium oxide according to claim 1, wherein the oxidative gas is an oxygen gas containing water steam.

4. A process for producing a titanium oxide according to claim 3, wherein the oxidative gas contains steam in an amount of at least 0.1 mol per 1 mol of an oxygen gas.

5. A process for producing a titanium oxide according to claim 1, wherein said titanium halogenide is titanium tetrachloride.

6. The process according to claim 1, wherein the residence time is 0.01 to 0.05 seconds.

7. A vapor phase process for producing a titanium oxide comprising:
   reacting a titanium halogenide-containing gas with an oxidative gas by introducing the titanium halogenide-containing gas and the oxidative gas into a reactor, to thereby allow reaction to proceed, with the temperature of the interior of the reactor being 900° C. to less than 1,000° C.,
   maintaining a residence time of the titanium halogenide-containing gas and the oxidative gas in the reactor at temperature range of 900° C. to less than 1,000° C. of 0.005 seconds to 0.05 seconds to obtain a low rutile titanium oxide having a rutile content of 5% or less, and
   further comprising dehalogenating the obtained titanium oxide by means of a dry dehalogenation method.

8. A process for producing a titanium oxide according to claim 7, wherein, in the dry dehalogenation method, titanium oxide is heated to 200 to 500° C.

9. A process for producing a titanium oxide according to claim 7, wherein, in the dry dehalogenation method, a steam-containing gas is heated to 200 to 1,000° C., and is brought into contact with titanium oxide.

10. A process for producing a titanium oxide according to claim 9, wherein the steam-containing gas is air containing steam in an amount of at least 0.1 vol. %.

11. A process for producing a titanium oxide according to claim 9, wherein the ratio by mass of the steam to the titanium oxide is at least 0.01.

12. The process according to claim 7, wherein the residence time is 0.01 to 0.05 seconds.

13. A vapor phase process for producing a titanium oxide comprising:

reacting a titanium halogenide-containing gas with an oxidative gas by introducing the titanium halogenide-containing gas and the oxidative gas into a reactor, to thereby allow reaction to proceed, with the temperature of the interior of the reactor being 900° C. to less than 1,000° C., maintaining a residence time of the titanium halogenide-containing gas and the oxidative gas in the reactor at temperature range of 900° C. to less than 1,000° C. of 0.005 seconds to 0.05 seconds to obtain a low rutile titanium oxide having a rutile content of 5% or less, and further comprising dehalogenating the obtained titanium oxide by means of a wet dechlorination method, to thereby yield a slurry containing a titanium oxide.

14. A process for producing a titanium oxide according to claim 13, wherein, in the wet dehalogenation method, titanium oxide is suspended in water, and chlorine which is transferred to a liquid phase is discharged to the outside of the resultant suspension.

15. A process for producing a titanium oxide according to claim 13 or 14, wherein, in the wet dehalogenation method, separation of chlorine is performed by use of an ultrafiltration membrane.

16. A process for producing a titanium oxide according to claim 13 or 14, wherein, in the wet dehalogenation method, separation of chlorine is performed by use of a reverse osmosis membrane.

17. A process for producing a titanium oxide according to claim 13 or 14, wherein, in the wet dechlorination method, separation of chloride is performed by use of a filter press.

18. The process according to claim 13, wherein the residence time is 0.01 to 0.05 seconds.

* * * * *